Figure 6:
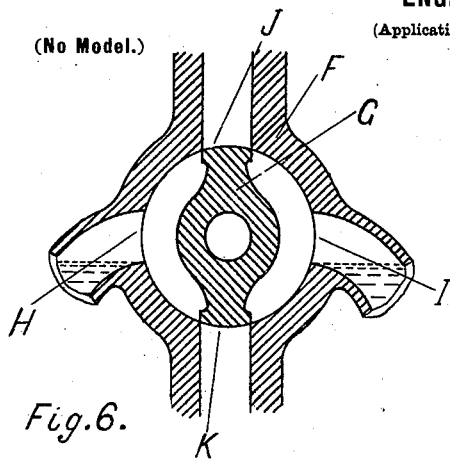

No. 620,182. Patented Feb. 28, 1899.
W. RIPPER.
INSTRUMENT FOR INDICATING CONTINUOUSLY MEAN EFFECTIVE PRESSURE ON ENGINE PISTONS.
(Application filed Mar. 7, 1898.)
(No Model.) 2 Sheets—Sheet 1.
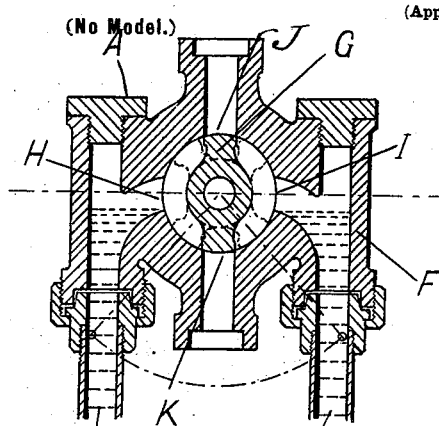
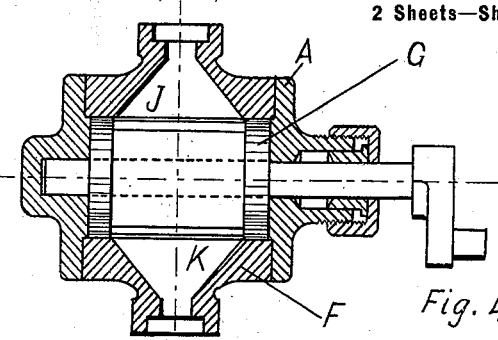
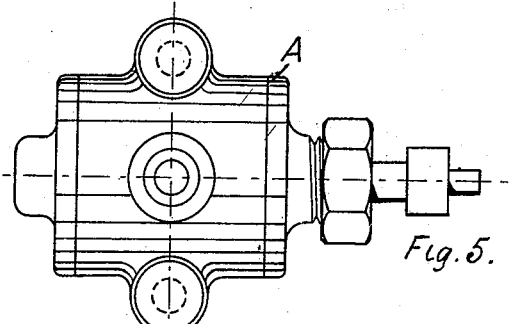
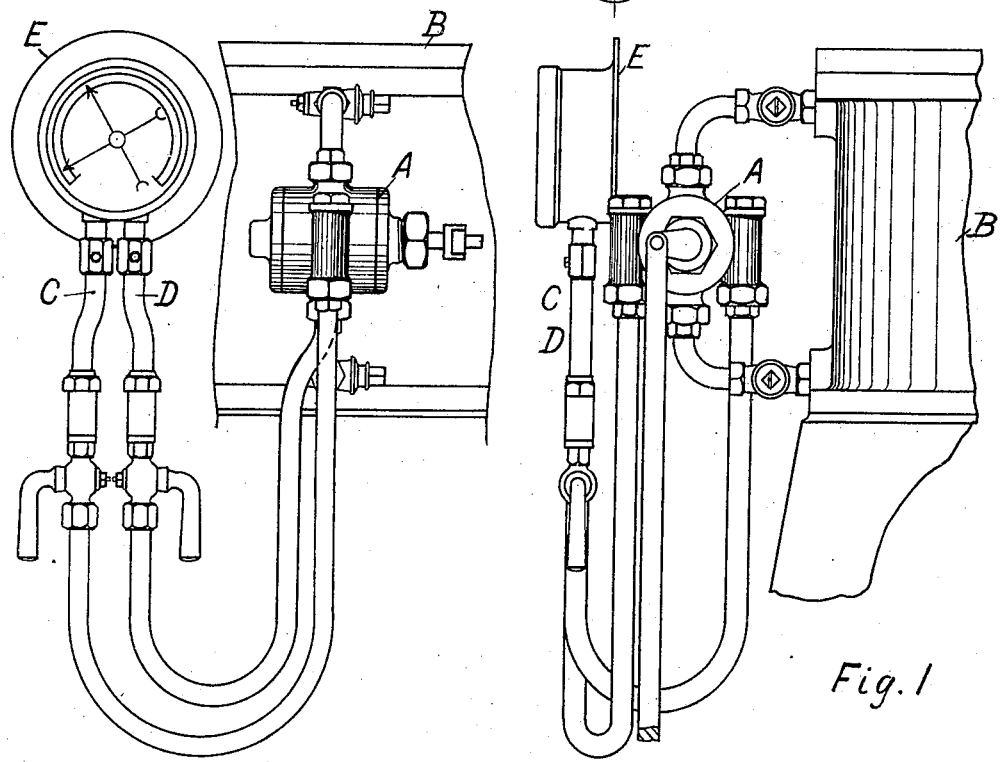
To pressure gages J & K from Engine Cylinder
Fig. 3.
Fig. 4.
Fig. 5.
Fig. 2.
Fig. 1.
Witnesses
Frank M. Clark
W. H. Bausto
Inventor
William Ripper No. 620,182. Patented Feb. 28, 1899.
W. RIPPER.
INSTRUMENT FOR INDICATING CONTINUOUSLY MEAN EFFECTIVE PRESSURE ON ENGINE PISTONS.
(Application filed Mar. 7, 1898.)

(No Model.) 2 Sheets—Sheet 2.

Witnesses
Frank M. Clark
W H Bairsto

Inventor
William Ripper

UNITED STATES PATENT OFFICE.

WILLIAM RIPPER, OF SHEFFIELD, ENGLAND.

INSTRUMENT FOR INDICATING CONTINUOUSLY MEAN EFFECTIVE PRESSURE ON ENGINE-PISTONS.

SPECIFICATION forming part of Letters Patent No. 620,182, dated February 28, 1899.

Application filed March 7, 1898. Serial No. 672,987. (No model.)

*To all whom it may concern:*

Be it known that I, WILLIAM RIPPER, a citizen of Great Britain, residing at Sheffield, in the county of York, England, have invented a new and useful Instrument for the Purpose of Indicating Continuously the Mean Effective Pressure of the Steam or Gas Acting on an Engine-Piston, (for which I have obtained provisional protection in Great Britain, dated August 17, 1897, No. 18,982;) and I do hereby declare the following to be a full, clear, and exact description of the invention, such as will enable others skilled in the art to which it appertains to make and use the same.

My invention relates to improvements in methods of finding the mean effective pressure of the steam or gas acting on the piston of an engine and of indicating the same continuously by taking the difference between the readings of two pressure-gages or of two independent pointers on the same dial. The readings indicated by these two pointers represent, respectively, the pressure of the forward or impulse steam acting on the piston and indicated continuously by one pointer and the pressure of the backward or exhaust steam acting against the piston which is indicated continuously by the other pointer. By taking the difference between these two readings the mean effective pressure on the piston is obtained.

The mean pressure indicated, as above stated, is the mean pressure during the time or period of the stroke of the piston, and it is therefore the mean pressure reckoned on a time-scale as distinguished from the mean pressure reckoned on a space-scale as given by the ordinary type of engine-indicator; but these two kinds of mean pressure are so nearly equal in value as to be considered for all practical purposes identical.

Where absolute accuracy is required, the instrument herein described is first standardized against a standard indicator of the ordinary type attached to the same engine, and the readings of the instrument are afterward corrected accordingly by the use of a factor of correction.

The objects of my invention are to provide a ready and continuous means of observing the mean pressure exerted on the piston of an engine at any given time and of noting and recording the changes of power recurring from various causes from time to time. I attain these objects by the mechanism illustrated in the accompanying drawings.

Figure 7:
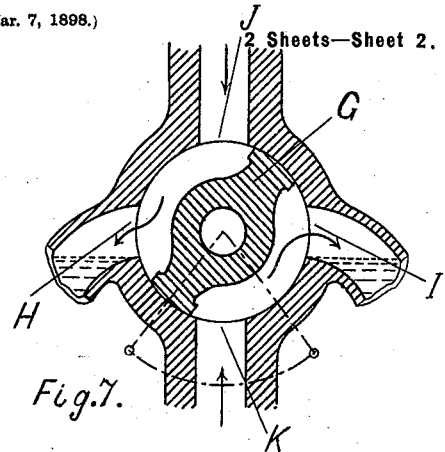
Figure 8:
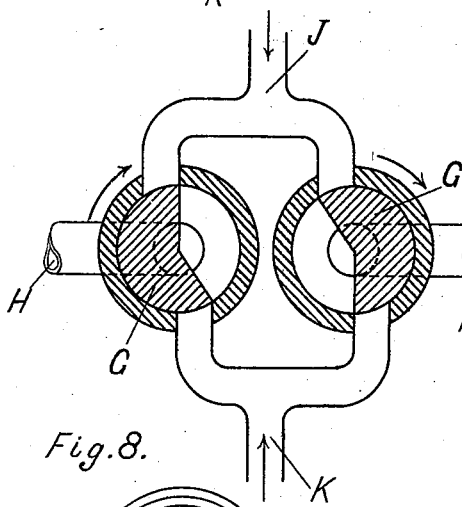
Figure 9:
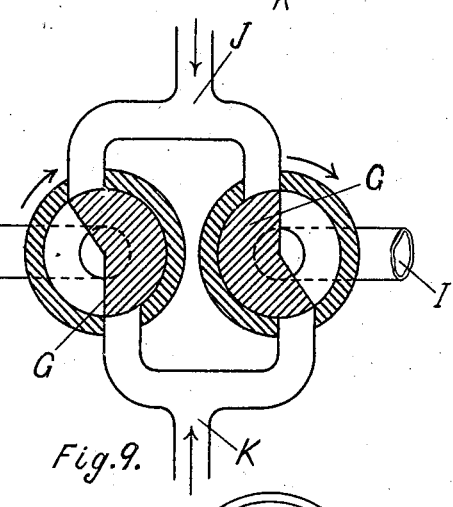
Figure 10:
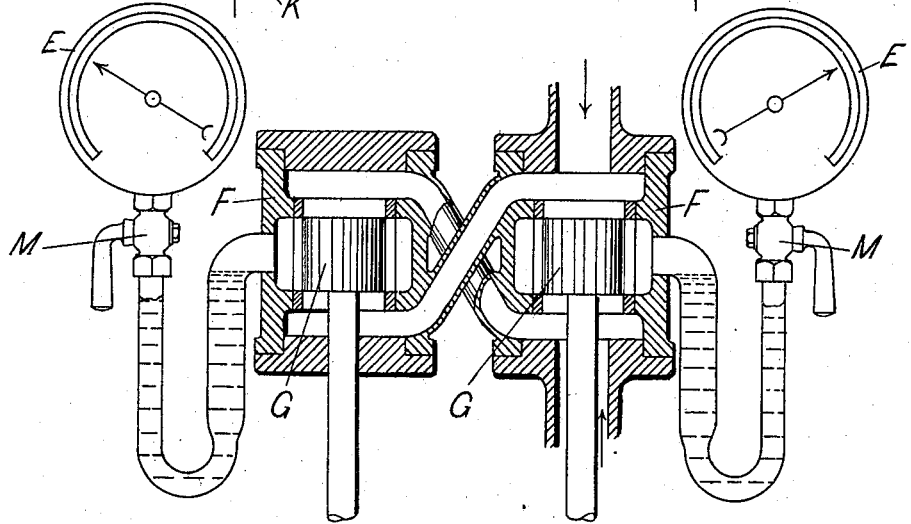

Figure 1 is a side elevation showing the position and general method of attachment of the instrument A to a short-stroke vertical engine-cylinder B. Fig. 2 is a front elevation of the same, showing more clearly the attachments C D of the pressure gage or gages E to the instrument A. Fig. 3 is a transverse section of the instrument A, showing that the instrument itself consists of a valve-box F and valve G with an arrangement of ports H I J K, over ports J and K of which the valve G moves, opening and closing, as required, communication between the engine-cylinder at J and K and the pressure-gages at H and I. Fig. 4 is a longitudinal section, and Fig. 5 a plan, of the valve-box A. The action of this valve may be best understood by reference to Fig. 6, which shows the same valve in mid-position with the two ports J and K closed. Fig. 7 shows the valve with the same ports fully opened, the impulse-steam acting on the forward-pressure gage connected to H, while the exhaust-steam from the other end of the cylinder acts upon the back-pressure gage connected to I. If the position of the valve is reversed, communication is now opened with opposite ends of the cylinder; but the same gages as before will again receive the impulse and back-pressure, respectively, the forward or impulse steam being always directed to the gage through H, while the backward or exhaust steam is always directed to the gage through I. Figs. 8, 9, and 10 are modified arrangements of this valve required for use with different types of engines and for different methods of attachment to the moving parts of the engine; but each form of valve fulfils in every particular the same common conditions, as hereinafter set forth. Figs. 8 and 9 show the arrangement of the valve when rotating on its own axis. This valve is shown in Figs. 8 and 9 as two separate valves G G on separate axes; but the two parts are usually worked on one and the same axis. In Fig. 8 the passage J is the connection with the top or back end of the cylinder, and K is the connection with the bottom or crank end of the cylinder. Each connection is branched where the pipe joins the instrument, as shown. Noting the direction of the arrows and considering the engine-piston at the top of its stroke, it will be seen that when the rotation of the valves G G begins the impulse-steam will pass through the opening I to the forward-pressure gage and the exhaust-steam will pass through the opening H to the back-pressure gage. Fig. 9 shows the position of the valves G G after the engine has turned through half a revolution, the piston now being at the bottom of the stroke. Again noting the direction of the arrows, it will be seen that when the valves G G move the impulse-steam will again enter the forward-pressure gage through I and the exhaust-steam will enter the back-pressure gage through H. Referring to Fig. 10, an exactly similar distribution of the steam is obtained by the two small piston-valves G G working in barrels or cylindrical cases F F and passing over ports, as shown.

The fundamental conditions required for obtaining the result herein described are fulfilled in common by each of the valves in Figs. 6, 7, 8, 9, and 10, and these conditions are as follows: First, the valve or valves are without lap and when in mid-position the communication between the engine-cylinder and the gages is closed for both ends of the cylinder, and the engine-piston is then at or about the beginning of its stroke; second, when the engine-piston moves the valve also moves simultaneously and opens a connection between the forward-pressure side of the piston and the forward-pressure gage and between the back-pressure side of the piston and the back-pressure gage; third, the valve or valves by moving over the ports open communication between the two opposite ends of the cylinder and their respective pressure-gages, each at the same moment, and maintain the communication open in each case during a half-revolution of the crank; fourth, on the reverse stroke of the engine the movement of the valve again directs the forward and backward pressure steam into the forward and backward pressure gages, respectively; fifth, the valve effectually prevents at all times any communication taking place between the two ends of the engine-cylinder; sixth, the valve is worked by an eccentric (or an equivalent motion) set at ninety degrees ahead or behind the engine-crank, and the valve has then no "lead;" seventh, when the valve has lead, so as to give promptness of admission of the steam to the gage, the eccentric (or equivalent motion) driving the valve of the instrument is set ninety degrees plus the angle of the lead ahead of the engine-crank or ninety degrees less the angle of lead behind the engine-crank.

The correct indication by the gage of the mean effect of the steam-pressure depends upon three points—namely, first, that the steam enters the instrument without loss by friction or throttling; second, that the steam acts upon a surface of water or other liquid through which the pressure is transmitted to the gage, and, third, that the oscillations of the finger of the gage may be steadied without interfering with the accuracy of the reading. The first two points are secured by the design herein described and the third by inserting a regulating cock or cocks M in the pipe connecting the instrument with the gage, care being taken that the throttling always takes place in that portion of the pipe containing water and not steam.

I claim as my invention—

In combination, with the cylinder of an engine, a pair of pressure-gages, pipe connection from said gages to the motive-fluid spaces of said cylinder on each side of the piston, a reversing-valve interposed in said pipe connections and adapted to automatically reverse the connections whereby one pressure-gage is maintained constantly in communication with the expansion and the other in communication with the exhaust, substantially as described.

In witness whereof I have hereunto set my hand in presence of two witnesses.

WILLIAM RIPPER.

Witnesses:
FRANK M. CLARK,
W. H. BAIRSTO.